US006953562B2

(12) United States Patent
Baker et al.

(10) Patent No.: US 6,953,562 B2
(45) Date of Patent: Oct. 11, 2005

(54) PREPARATION OF MULTIFACETED GRAPHITIC NANOTUBES

(75) Inventors: R. Terry K. Baker, Hopkinton, MA (US); Nelly M. Rodriguez, Hopkinton, MA (US)

(73) Assignee: Catalytic Materials, LLC, Holliston, MA (US)

( * ) Notice: Subject to any disclaimer, the term of this patent is extended or adjusted under 35 U.S.C. 154(b) by 329 days.

(21) Appl. No.: 10/015,353

(22) Filed: Dec. 11, 2001

(65) Prior Publication Data

US 2003/0108479 A1 Jun. 12, 2003

(51) Int. Cl.$^7$ .................................................. D01F 9/12
(52) U.S. Cl. .................................................. 423/447.3
(58) Field of Search ....................................... 423/447.3

(56) References Cited

U.S. PATENT DOCUMENTS

| | | | |
|---|---|---|---|
| 5,149,584 A | 9/1992 | Baker et al. ................ 428/297 |
| 5,413,866 A | 5/1995 | Baker et al. ............. 423/447.2 |
| 5,458,784 A | 10/1995 | Baker et al. ................ 210/674 |
| 5,618,875 A | 4/1997 | Baker et al. ................ 524/495 |
| 5,653,951 A | 8/1997 | Rodriguez et al. .......... 423/439 |
| 6,143,689 A | * 11/2000 | Moy et al. .................. 502/170 |
| 6,159,538 A | 12/2000 | Rodriguez et al. ..... 427/213.31 |

OTHER PUBLICATIONS

N.M. Rodriguez et al.; Promotional Effect of Carbon Monoxide on the Decomposition of Ethylene Over an Iron Catalyst; Journal of Catalyst 144, 93–108 (1993); Academic Press, Inc.

* cited by examiner

*Primary Examiner*—Stuart Hendrickson
(74) *Attorney, Agent, or Firm*—Henry E. Naylor; Kean, Miller, Hawthorne, D'Armond, McCowan & Jarman, LLP

(57) ABSTRACT

A method for producing high yields of high-purity multifaceted graphitic nanotubes wherein a mixture of CO and $H_2$ is reacted in the presence of a catalyst system comprised of at least one Group VIII metal component and at least one Group II metal oxide at effective temperatures.

12 Claims, 1 Drawing Sheet

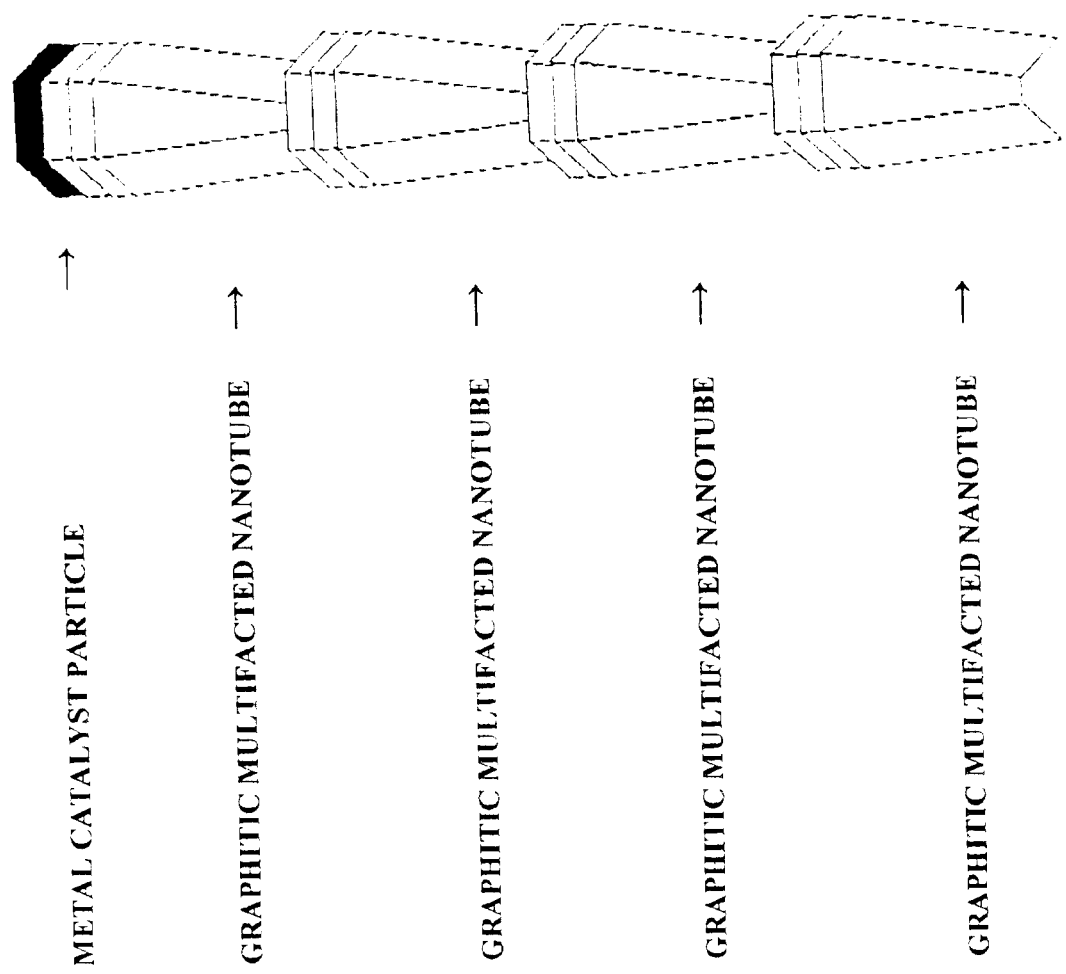

PREPARATION OF MULTIFACETED GRAPHITIC NANOTUBES

BACKGROUND OF THE INVENTION

1. Field of the Invention

This present invention relates to a method for producing high yields of high-purity multifaceted graphitic nanotubes wherein a mixture of CO and $H_2$ is reacted in the presence of a catalyst system comprised of a Group VIII metal component and Group II metal oxide at effective temperatures.

2. Description of Related Art

Nanostructure materials, particularly carbon nanostructure materials, are quickly gaining importance for various potential commercial applications. Such applications include their use to store hydrogen, to serve as catalyst supports, to be useful in various batteries, and as reinforcing components for polymeric composites. U.S. Pat. Nos. 5,149,584 and 5,618,875 to Baker et al. teach carbon nanofibers as reinforcing components in polymer reinforced composites. The carbon nanofibers can either be used as is, or as part of a structure comprised of carbon fibers having carbon nanofibers grown therefrom.

U.S. Pat. No. 5,413,866 to Baker et al. teaches carbon nanostructures characterized as having: (i) a surface area from about 50 m2/g to 800 m2/g; (ii) an electrical resistivity from about 0.3 $\mu$ohm·m to 0.8 $\mu$ohm·m; (iii) a crystallinity from about 5% to about 100%; (iv) a length from about 1 $\mu$m to about 100 $\mu$m; and (v) a shape that is selected from the group consisting of branched, spiral, and helical. These carbon nanostructures are taught as being prepared by depositing a catalyst containing at least one Group IB metal and at least one other metal on a suitable refractory support, then subjecting the catalyst-treated support to a carbon-containing gas at a temperature from the decomposition temperature of the carbon-containing gas to the deactivation temperature of the catalyst.

U.S. Pat. No. 5,458,784 also to Baker et al. teaches the use of the carbon nanostructures of U.S. Pat. No. 5,413,866 for removing contaminants from aqueous and gaseous steams; and U.S. Pat. Nos. 5,653,951 and 6,159,538 to Rodriguez et al. disclose and claim methods of incorporating hydrogen into layered nanostructure materials characterized as having: (i) crystalline regions; (ii) interstices within the crystalline regions which interstices are from about 0.335 nm to 0.67 nm, and (iii) surfaces of said nanostructure which define the interstices, which surfaces have chemisorption properties with respect to hydrogen. All of the above referenced U.S. patents are incorporated herein by reference.

Carbon nanostructures, particularly carbon nanofibers, are typically produced by growing them from suitable powdered metal catalysts at elevated temperatures, in the presence of hydrogen and an effective decomposing carbon-containing compound. Typically, the carbon-containing compound is selected from CO, methane, ethane, ethylene, acetylene, propane, propylene, butane, butene, butadiene, pentane, etc. While such a method is currently used to produce carbon nanostructures in substantial yields, the width of the nanostructures is difficult to control. Narrow width nanostructures are desirable. For example, the average width of a carbon nanostructure is dependent on the average size of the metal catalytic particle from which it was grown. This size typically ranges from about 25 to 450 nm.

One attempt to overcome this shortcoming of controlling carbon nanostructure width was to disperse catalytic metal particles over a suitable substrate, such as an amorphous carbon film, in order to produce carbon nanostructures having a more uniform narrower width. This was achieved to some degree since a more uniform catalyst particle size dispersion was achieved. Although the carbon nanostructures resulting from such a method were found to have an average width about half that of those produced by more conventional techniques at that time, the yield of nanostructures was vastly reduced and unacceptable. In addition, the support material becomes an added impurity that should be avoided when such a method is used.

Thus, there is a need in the art for methods for producing high yields of carbon nanostructures, especially carbon nanofibers, having a substantially uniform narrow width.

SUMMARY OF THE INVENTION

In accordance with the present invention there is provided a method for producing multifaceted graphitic nanotubes, which process comprises:

i) reacting a mixture of $CH_4$ and $O_2$ in the presence of a catalyst system comprised of a mixture of at least one Group VIII metal oxide and at least one Group II metal oxide at effective temperatures to produce a mixture of CO and $H_2$; and ii) reacting at least a portion of the mixture of CO and $H_2$ in the presence of a catalyst system comprised of a mixture of at least one Group VIII metal component and at least one Group II metal oxide at effective temperatures to grow multifaceted graphitic nanofibers therefrom.

In a preferred embodiment of the present invention the mixture of $CH_4$ and $O_2$ is reacted at a temperature from about 350° C. to about 850° C.

In another preferred embodiment of the present invention the temperature at which the graphitic nanofibers are grown is from about 550° C. to about 670° C.

Also in accordance with the present invention there is provided a process for producing multifaceted graphitic nanotubes, which process comprises:

reacting at least a portion of a mixture of CO and $H_2$ in the presence of a catalyst system comprised of a mixture of Co and MgO at effective temperatures to grow multifaceted graphitic nanofibers therefrom.

BRIEF DESCRIPTION OF THE FIGURE

The sole FIGURE hereof is a rough representation of the primary features of the carbon nanotubes produced in accordance with the present invention. It shows a non-cylindrical multifaceted tubular structure containing a substantial amount of edge sites growing from a metal catalyst particle. The tubular nanostructure also shows a tube within a tube structure.

DETAILED DESCRIPTION OF THE INVENTION

The propensity for carbon nanostructures to be formed during the interaction of a carbon-containing compound, such as hydrocarbons and carbon monoxide with hot metal surfaces is known. It has been recognized in recent years that a unique set of chemical and physical properties can be achieved if one controls the growth and structural characteristics of carbon nanostructures by the use of selected catalysts. The unusual properties exhibited by carbon nanostructured materials, coupled with the possibility of tailoring these properties as well as their dimension, have an impact on research activities associated with such carbon nanostructures. Of particular importance are carbon nanostructures having a relatively high-graphite content and narrow widths, since such nanostructures have a variety of potential commercial applications. Unfortunately, conventional methods for producing carbon nanostructures are not suitable for producing high yields of carbon nanostructures having relatively uniform narrow widths. The width of the carbon nanostructures is typically dictated by the size of the catalytic metal particles from which they are grown. This size, or width, of conventional carbon nanostructures, such as nanofibers will typically range from about 25 to 450 nm. Better control of, and narrower width nanostructures are highly desirable.

The multifaceted graphitic nanotubes of the present invention will have their platelets oriented substantially parallel to the growth axis of the nanofibers in such a way that multifaceted non-cylindrical tubular structures are produced. The preferred nanotubes are those having properties that include: (i) a surface area from about 20 to 3,000 m2/g, preferably from about 50 to 800 $m^2/g$, more preferably from about 100 to 700 $m^2/g$, and most preferably from about 250 to 350 $m^2/g$, which surface area is determined by N2 adsorption at −196° C.; (ii) a crystallinity from about 5% to about 100%, preferably from about 50% to 100%, more preferably from about 75% to 100%, most preferably from about 90% to 100%, and ideally substantially 100%; and (iii) interstices of about 0.335 nm to about 0.40 nm, preferably about 0.335 nm. The interstices are the distance between the graphite platelets. The shape of the resulting multifaceted nanotubes of the present invention can be any suitable shape. Non-limiting examples of preferred shapes include straight, branched, twisted, spiral, helical, and coiled. As previously mentioned, the graphitic platelets of the nanotubes of the present invention will be oriented substantially parallel to the growth, or longitudinal axis of the nanofibers and are multi-faceted tubular in structure. That is, they will have a structure that resembles a multi-faced pencil, or a so-called "allen" wrench and will preferably be a non-cylindrical tube within a non-cylindrical tube structure. Further, the surface area of the carbon nanofibers can be increased by careful activation with a suitable etching agent, such as carbon dioxide, steam, or the use of a selected catalyst, such as an alkali or alkaline-earth metal. The terms "nanotubes" and "nanofibers" can by used interchangeably herein. Nanotubes are one form of carbon nanofibers in which the graphite platelets are aligned substantially parallel to the longitudinal axis of the nanofibers.

The carbon nanostructures of the present invention are catalytically grown from an unsupported mixture of at least one Group VIII metal component and at least one Group II metal oxide. The one or more Group VIII metal component is preferably in the metallic state and can be comprised of a single metal or an alloy or a bimetallic. If the Group VIII metal component is comprised of a single metal it is preferred that it be selected from Fe, Ni, and Co, with Co being more preferred. If the Group VIII metal component is a bimetallic, the preferred bimetallics are Fe:Ni and Co:Ni. Preferred Group II metals are Ca and Mg, with Mg being the more preferred. The weight ratio of the Group VIII metal component to Group II metal oxide will be from about 5:95 to 24:36. A mixture of CO and $H_2$ is decomposed in the presence of this mixed catalyst system at temperatures from about 450° C. to about 800° C., more preferably from about 550° C. to about 700° C. It is also preferred that hydrogen be present during the decomposition of the carbon-containing compound.

One preferred process for producing the multifaceted graphitic nanotubes of the present invention is a two-stage process wherein the first stage is the preparation of the CO and $H_2$ mixture and the second stage is the growth of the multifaceted carbon nanotubes. Growth of the carbon nanotubes takes place by reacting the $CO/H_2$ mixture in the presence of the Group VIII metal component and the Group II metal oxide catalyst system at suitable temperatures. In the first stage, a mixture of a $CH_4$ and $O_2$ is fed to a reaction zone containing a catalyst system comprised of a Group VIII metal oxide component and Group II metal oxide wherein it is converted at a temperature from about 350° C. to about 1000° C., preferably at temperatures from about 450° C. to about 1000° C., and more preferably at temperatures from about 600° C. to about 850° C. for an effective amount of time to convert a substantial amount, preferably all, of the mixture of $CH_4$ and $O_2$ to CO and $H_2$. The mole ratio of $CH_4$ to $O_2$ must be 2:1. The $O_2$ can be any suitable oxygen-containing gas and can be substantially pure $O_2$. Air can be used as the source of $O_2$ as long as the nitrogen is first removed. At least a portion of the product $CO/H_2$ product stream is then conducted to a second stage reaction zone containing a catalyst system comprised of Co and Group II metal oxide, preferably MgO where it is reacted at temperatures from about 550° C. to about 700° C., preferably from about 600° C. to about 700° C., more preferably from about 600° C. to about 650° C. for an effective amount of the time to produce multifaceted graphitic nanotubes. The weight ratio of CO to $H_2$ will be from about 20 to 1, preferably from about 10 to 1, and more preferably from about 4 to 1. It was unexpectedly found by the inventors hereof that substantially all of the carbon nanostructures produced in accordance with the present process are the desired multifaceted non-cylindrical graphitic nanotubes. It was also found that the nanotubes will preferably be a layered nanostructure characterized as a non-cylindrical multifaceted nanotubes within a non-cylindrical multifaceted nanotubes nanostructure.

By graphitic is meant that the multifaceted nanotubes will be at least about 5% graphitic, preferably at least about 50% graphitic, more preferably at least about 90% graphitic, and most preferably at least about 95% graphitic. They will also have a relatively high number of edge sites when compared with cylindrical nanotubes. By relatively high number we mean that the multifaceted nanotubes of the presently claimed invention will have at least about 5%, preferably at least about 10%, and more preferably at least about 15% of the exposed surfaces will be edge sites.

After the multifaceted carbon nanotubes are grown they can be treated with an aqueous solution of an inorganic acid, such as a mineral acid, to remove any excess catalyst particles. Non-limiting examples of mineral acids, which can be used, include sulfuric acid, nitric acid, and hydrochloric acid. Preferred is hydrochloric acid.

The edges of the graphite platelets may be etched with an appropriate etching agent, preferably carbon dioxide, steam, or a suitable catalyst such as an alkali or alkaline-earth metal.

The present invention will be illustrated in more detail with reference to the following examples, which should not be construed to be limiting in scope of the present invention.

EXAMPLE 1

TABLE 1

Effect of catalyst calcination temperature on the growth of graphite nanotubes (GNT) from the 48 wt. % Co/MgO catalyzed decomposition of CO/H₂ (4:1) at 600° C. for 2 hours.

| Calcination Temp (° C.) | Reduction Temp (° C.) | Yield (g-GNT/g-metal) | GNT width range (nm) | Average width GNT (nm) |
|---|---|---|---|---|
| 500 | 850 | 72.9 | 2.5–23.0 | 8.7 |
| 700 | 850 | 16.7 | 2.5–20.0 | 7.5 |
| 850 | 850 | 2.1 | 2.5–15.0 | 5.7 |

TABLE 2

Effect of the CO/H₂ ratio on the growth of graphite nanofibers using a 48 wt. % Co/MgO at 600° C. for 2 hours. Catalyst was calcined at 500° C. and reduced at 850° C.

| CO/H₂ ratio | Yield (g-GNT/g-metal) | GNT width range (nm) | Average width GNT (nm) |
|---|---|---|---|
| 100:1 | 39.5 | 4.0–37.0 | 12.6 |
| 39:1 | 77.0 | 3.0–25.0 | 9.5 |
| 19:1 | 79.0 | 2.5–24.0 | 8.9 |
| 12:1 | 74.5 | 2.5–23.0 | 8.6 |
| 9:1 | 74.5 | 2.5–23.0 | 8.6 |
| 4:1 | 72.8 | 2.5–24.0 | 8.7 |
| 2:1 | 66.6 | 4.0–29.0 | 11.9 |
| 1:1 | 60.3 | 5.0–39.0 | 17.0 |
| 2:3 | 35.4 | 5.0–44.0 | 20.7 |
| 1:2 | 8.3 | 5.0–49.0 | 22.4 |

TABLE 3

Effect of catalyst reduction temperature on the growth of graphite nanofibers from the 48 wt. % Co/MgO catalyzed decomposition of CO/H₂ (9:1) at 600° C. for 2 hours. Catalyst samples all calcined at 500° C.

| Reduction Temp (° C.) | Yield (g-GNT/g-metal) | GNT width range (nm) | Average width GNT (nm) |
|---|---|---|---|
| 450 | 85.3 | 3.0–22.0 | 9.0 |
| 550 | 89.4 | 2.5–25.0 | 8.8 |
| 600 | 95.7 | 2.5–22.0 | 8.0 |
| 650 | 91.5 | 3.0–26.0 | 9.1 |
| 750 | 85.3 | 3.0–22.0 | 8.2 |
| 850 | 62.4 | 2.5–27.0 | 8.4 |
| 1000 | 12.5 | 2.5–31.0 | 9.0 |

TABLE 4

Effect of reaction temperature on the growth of graphite nanofibers from the 48 wt. % Co/MgO catalyzed decomposition of CO/H₂ (9:1) for 2 hours. Catalyst was calcined at 500° C. and reduced at 600° C.

| Reaction Temp (° C.) | Yield (g-GNT/g-metal) | GNT width range (nm) | Average width GNT (nm) |
|---|---|---|---|
| 550 | 81.1 | 2.5–22.0 | 7.7 |
| 600 | 95.7 | 2.5–24.0 | 8.0 |
| 650 | 77.0 | 4.0–34.0 | 11.5 |

TABLE 5

Effect of Co/MgO catalyst composition on the growth of graphite nanofibers from the decomposition of CO/H₂ (9:1) at 600° C. for 2 hours. Catalyst was calcined at 500° C. and reduced at 600° C.

| Co loading (wt. %) | Yield (g-GNT/g-metal) | GNT width range (nm) | Average width GNT (nm) |
|---|---|---|---|
| 12 | 75.0 | 2.5–9.0 | 5.4 |
| 24 | 150.0 | 2.5–17.0 | 6.2 |
| 36 | 113.3 | 2.5–20.0 | 7.6 |
| 48 | 95.7 | 2.5–22.0 | 8.0 |

What is claimed is:

1. A method for producing multifaceted graphitic nanotubes, which process comprises:
    i) reacting a mixture of $CH_4$ and $O_2$ in the presence of a catalyst system comprised of a mixture of at least one Group VIII metal oxide and at least one Group II metal oxide at effective temperatures to produce a mixture of CO and H2; and
    ii) reacting at least a portion of the mixture of CO and H2 in the presence of a catalyst system comprised of a mixture of a Group VIII metal component selected from Co and Ni and Group II metal oxide at effective temperatures to grow multifaceted graphitic nanotubes therefrom, wherein said multifaceted graphitic nanotubes are comprised of platelets that are oriented substantially parallel to the growth axis of said nanotubes, and iii) recovering said nanotubes.

2. The method of claim 1 wherein the mixture of $CH_4$ and $O_2$ is reacted at a temperature from about 350° C. to about 1000° C.

3. The method of claim 1 wherein the Group VIII metal is Co.

4. The method of claim 1 wherein the mixture of $CH_4$ and $O_2$ is reacted at a temperature from about 350° C. to about 1000° C.

5. The method of claim 4 wherein the mixture of $CH_4$ and $O_2$ is reacted at a temperature from about 450° C. to about 1000° C.

6. The method of claim 1 wherein the temperature at which the graphitic nanotubes are grown is from about 550° C. to about 700° C.

7. The method of claim 6 wherein the temperature at which the graphitic nanotubes are grown is from about 600° C. to about 700° C.

8. The method of claim 1 wherein the mixture of $CH_4$ and $O_2$ is reacted at a temperature from about 450° C. to about 1000° C.

9. A method for producing multifaceted graphitic nanotubes, which process comprises:
    reacting at least a portion of mixture of CO and $H_2$ in the presence of a catalyst system comprised of a mixture of a Group VIII metal selected from Co and Ni and MgO at effective temperatures to grow multifaceted graphitic nanotubes therefrom, thereby producing multifaceted graphitic nanotubes comprised of platelets that are oriented substantially parallel to the growth axis instead of said nanotubes, and recovering said nanotubes.

10. The method of claim 9, wherein the Group VIII metal is Co.

11. The method of claim 9 wherein the temperature at which the graphitic nanotubes are grown is from about 550° C. to about 670° C.

12. The method of claim 11 wherein the temperature at which the graphitic nanotubes are grown is from about 600° C. to about 650° C.

* * * * *